Nov. 3, 1964
D. D. STOLTMAN
3,155,188
FRICTION FEED-BACK SPEED CONTROL
Filed Aug. 21, 1961
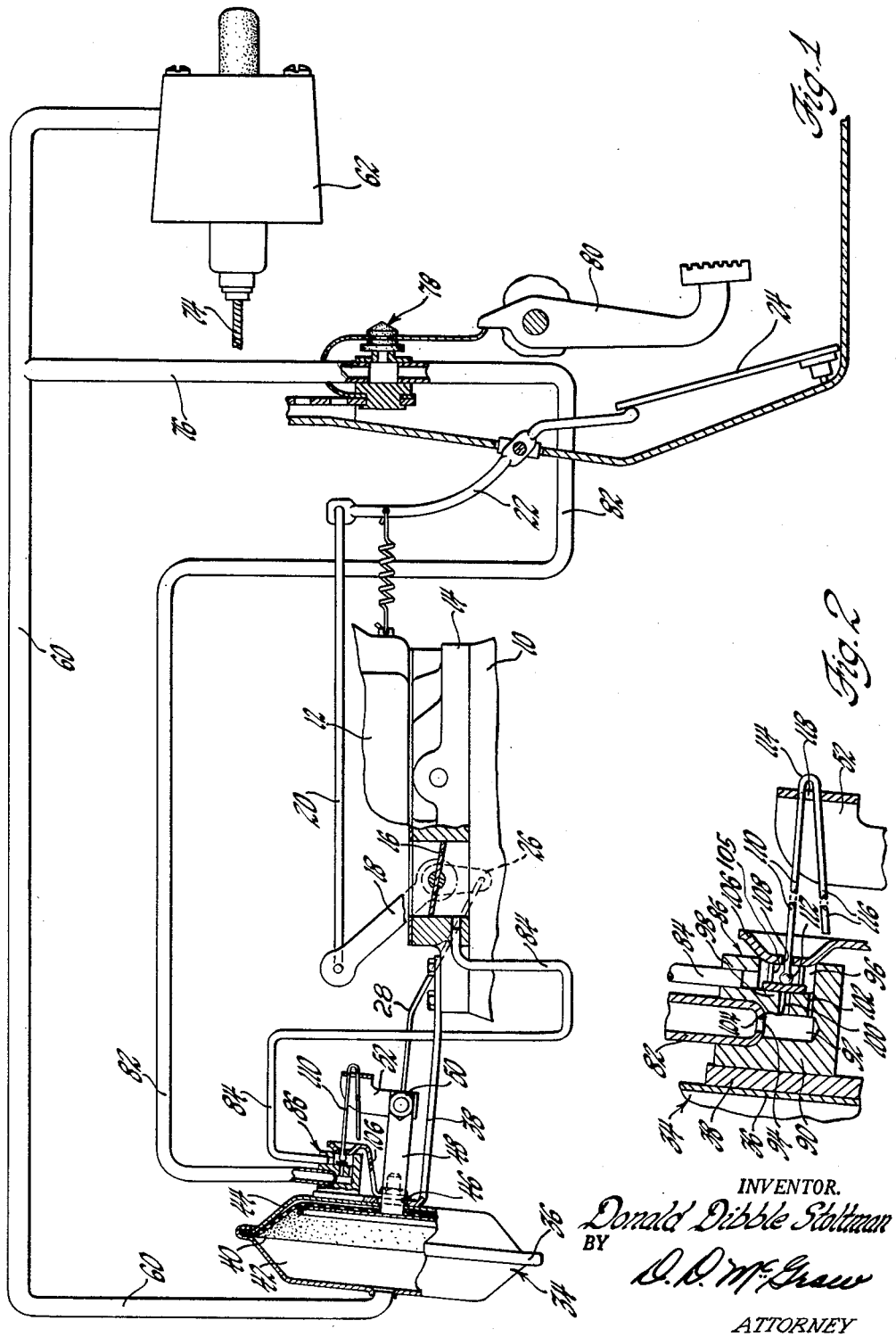
INVENTOR.
Donald Dibble Stoltman
BY
D.D. McGraw
ATTORNEY

United States Patent Office 3,155,188
Patented Nov. 3, 1964

3,155,188
FRICTION FEED-BACK SPEED CONTROL
Donald D. Stoltman, Henrietta, N.Y., assignor to General Motors Corporation, Detroit, Mich., a corporation of Delaware
Filed Aug. 21, 1961, Ser. No. 132,842
5 Claims. (Cl. 180—82.1)

The invention relates to a road speed control for automotive vehicles and more particularly to a speed control in which negative feed-back is obtained by a friction mechanism. A speed control system in which the invention is embodied may be similar to that of application Serial No. 115,539 filed June 7, 1961, and reference is hereby made to that application, which has a detailed description of operation of this type system.

The system of the above-noted application utilizes a vacuum negative feed-back arrangement and it has been found preferable at times to utilize a system for obtaining negative feed-back without the use of vacuum. It is now proposed to obtain this feed-back through the use of a friction device. This device results in an inexpensive mechanism for obtaining negative feed-back and operates effectively throughout the entire range of operation of the system.

In the drawings:

FIGURE 1 is a schematic presentation of a speed control system installed on a vehicle engine and embodying the invention. Parts are illustrated in section and broken away; and FIGURE 2 is an enlarged sectional view of the negative feed-back portion of the system of FIGURE 1.

The system embodying the invention will be generally described with reference being made to the above-identified application for further explanation. The system is installed in a vehicle to control the engine 10 and, therefore, the vehicle speed. The engine is provided with an intake manifold 12 on which is mounted a carburetor 14 for introducing a suitable fuel-air mixture into the engine under control of the throttle valve 16. A throttle link 18, connected to rotate the throttle valve 16, is actuated through throttle links 20 and 22 by the accelerator pedal 24. Pedal 24 is controllable by the vehicle operator in the usual manner. A throttle link 26 is also provided to which the servo throttle link control rod 28 is suitably attached. Movement of rod 28 by the servo 34 moves throttle link 26 and therefore throttle valve 16 to open the throttle valve.

Servo 34 includes servo housing 36 mounted to a suitable part of the engine by a mounting bracket 38. Housing 36 has a diaphragm 40 dividing the inner portion of the housing into a control chamber 42 and an atmospheric chamber 44. The latter chamber is maintained at atmospheric pressure at all times through the opening 46 provided in the housing for the diaphragm arm 48. Other suitable atmospheric venting means may also be provided if desired. Arm 48 is connected to rod 28 by an assembly 50 which also holds the bracket 52 on arm 48 in the position shown.

A control pressure line 60 is connected to the servo housing 36 so that control pressure may be impressed on diaphragm 40 through control chamber 42. Line 60 is connected to the speed sensing and setting unit 62 which may be similar to the control head of the application referred to above, but without the vacuum type negative feed-back feature of that control head. Unit 62 is preferably mounted on or adjacent the vehicle instrument panel in such a position to be readily accessible to the vehicle operator. The unit 62 is controlled in the same manner by the operator as is the control head of the application referred to and also senses vehicle speed through the control drive cable 74 as does that control head. A pressure less than atmospheric pressure is provided in line 60 by the use of an atmospheric bleed valve mechanism controlled by an actual vehicle speed sensing mechanism in the manner described in the above-identified application.

A line 76 interconnects line 60 with a brake pedal-operated spoiler valve assembly 78 which will provide atmospheric pressure in control chamber 42 immediately, under positive control of the vehicle operator, to render servo 34 inoperative to control the throttle valve 16. Valve assembly 78 is actuated when the vehicle operator engages the vehicle brakes through the brake pedal 80. Further details of this valve assembly and its operations are also found in the above-identified application.

A line 82 is also connected with valve assembly 78 and leads to the vacuum side of the throttle valve 16 to provide the differential pressure necessary for operation and control of the system. Another line 84 is connected to the negative feed-back assembly 86 attached to the servo 34 by one end of bracket 38. Assembly 86 includes a valve body 90 attached to the bracket 38. The valve body is provided with a chamber 92 to which line 82 is connected through the restrictive orifice 94. Another chamber 96 in valve body 90 has line 84 connected thereto and is divided from chamber 92 by a wall 98 through which orifices 100 and 102 are formed to interconnect the chambers. The restrictive orifice 102 is smaller than the restrictive orifice 94 while the combined cross-section areas of orifices 100 and 102 are larger than the cross-section area of orifice 94. A valve 104 located in chamber 96 is positioned so that it may open and close orifice 100 but has no effect on the function of orifice 102. Bracket and cover member 106 is attached to bracket 38 and extends on the side of valve body 90 containing chamber 96 and provides a closure for that chamber. An opening 108 in member 106 receives one end of a spring rod 110 so that the rod end 112 is in alignment with valve 104 and the movement of the rod in the opening 108 permits the opening and closing of the orifice 100 by the valve 104.

The speed sensing unit 62 is subjected to engine intake vacuum, at all times when the brake pedal is not applied, through line 84, chamber 96, orifice 102, chamber 92, orifice 94 and lines 82, 76 and 60. Restrictive orifice 100 is also open and orifice 94 is the controlling orifice at all times when valve 104 is not seated by the axial position of rod 110. This condition occurs when the device is in or just following a throttle closing maneuver.

Rod 110 has a hairpin bend 114 so that its other end 116 extends along the portion of the rod between end 112 and bend 114 at a slight relative angle. The portion of rod 110 adjacent bend 114 extends through an aperture 118 in arm 52, which is mounted on the diaphragm arm 48 and movable therewith along the length of rod 110. This provides a frictional sliding engagement of the rod and the arm which is utilized to obtain negative feed-back. As arm 52 moves to the left as seen in the drawing, it carries rod 110 with it. This is the direction of movement for opening the throttle valve 16. When valve 104 is forced by rod 110 into engagement with wall 98 so that orifice 100 is closed, as shown in FIGURE 2, further leftward movement of arm 52 causes rod 110 to frictionally slide in aperture 118 of arm 52, effectively shortening rod 110. When arm 52 reverses its movement, consonant with throttling closing movement, it moves to the right as seen in the drawing, and so does rod 110, permitting orifice 100 to be opened by valve 104. When rod end 112 engages member 106, rod 110 again frictionally slides in aperture 118 of arm 52, effectively lengthening rod 110. Another reversal of movement of arm 52, to the left, will then move rod 110 to the left at its just-established longer effective length until the above action is repeated.

If the vehicle speed decreases, the speed sensing unit 62 signals the power diaphragm 40 by providing a lower absolute pressure in line 60 to move arm 48, with bracket 52, and rod 28 to the left. Bracket 52 applies force to spring rod 110 to close orifice 100 by moving valve 104 so that it covers the orifice. The orifice remains closed as the throttle opens. The controlling orifice therefore becomes orifice 102 instead of orifice 94, and the rate of throttle opening decreases without regard to throttle position. When the speed sensing unit 62 initiates a throttle closing movement, the movement begins at a high rate of speed. This moves bracket 52 and spring rod 110, permitting the manifold vacuum directly applied to chamber 96 to open valve 104 and shift control from orifice 102 to orifice 94. Valve 104 may be guided by lands 105, or it may be attached to the end 112 of rod 110. This reduces the rate of throttle closure. Rod 110 slides freely through the opening 108 in the bracket and cover member 106 and this opening constitutes a small leak of raw vacuum which is permissible. The action of valve 104 under the opening and closing throttle conditions provides a hunt elimination effect obtained through the friction feed-back action of rod 110.

What is claimed is:

1. In a road speed control system for a vehicle having an engine controlled by a throttle operable by a fluid servo, a negative feed-back arrangement comprising, a valve body having first and second control orifices in series flow relation and a third orifice in parallel flow relation to said second orifice, said orifices being in fluid control connection with the throttle servo, valve means in said valve body for opening and closing said third orifice to shift control of the throttle servo between said first and second orifices, and means responsive to the opening and closing throttle movement of the system and connected to control said valve means in accordance with the thottle movement.

2. In a vehicle road speed control system having speed sensing means and power operated throttle control means controlled by said speed sensing means and movable in two opposite directions for opening and closing throttle movement, direction sensitive friction negative feed-back means operatively mechanically connected with said power operated throttle control means sensitive to the two opposite directions of movement of said power operated throttle control means for modifying the rate of response of said power operated throttle control means to said speed sensing means, said friction negative feed-back means comprising a mechanical element secured to said power operated throttle control means and a friction member frictionally engaged therewith and a feed-back control member mechanically structurally engaged by said friction member to be moved thereby in one feed-back rate-establishing direction upon movement of said power operated throttle control means and said mechanical element in one of the two opposite directions of movement, said feed-back control member being movable in another feed-back rate-establishing direction upon reverse movement of said friction member, the movements of said feed-back control member establishing different feed-back rates.

3. In a vehicle road speed control system comprising means sensing vehicle speed throughout a vehicle speed range and comparing the sensed vehicle speed to a predetermined desired vehicle speed and developing a control signal responsive thereto; a power operated throttle having servo means controlled by said speed sensing means in accordance with said developed signal, first and second means for modifying said developed signal, and means frictionally sensitive to actuation of said power operated throttle in one direction to render said first modifying means operable and said second modifying means inoperable and frictionally sensitive to movement of said power operated throttle in the other direction to render said second modifying means operable and said first modifying means inoperable, said frictionally sensitive means having a variable length mechanical connection to the servo including means frictionally resisting length variation thereof and maintaining the operable one of said modifying means operable until a reversal of direction of said power operated throttle occurs.

4. A speed control system for a vehicle having an internal combustion engine controlled by a throttle valve, said system comprising; a servo connected to operate said valve to control vehicle speed, a source of fluid pressure for actuating said servo, control means for said servo including vehicle speed error sensing and signal means for controlling fluid pressure transmitted from said source to said servo, negative feed-back means responsive to opening and closing throttle movement of said servo to modify the control of said vehicle speed error sensing means, and control means for said negative feed-back means; said negative feed-back means including, a pair of control orifices in parallel fluid flow relation intermediate said pressure source and said servo, one of said orifices having a smaller orifice area than the other of said orifices, orifice control means establishing the one of said orifices in control during throttle opening movement of said servo and the other of said orifices in control during throttle closing movement of said servo; said control means for said negative feed-back means including a variable effective length actuator for said orifice control means slidably and frictionally connected to said servo, the slidable frictional connection thereof continually resisting variations of effective length thereof but permitting same when the frictional resistance to effective length variation of said actuator is overcome.

5. A speed control system for a vehicle having an internal combustion engine controlled by a throttle valve, said system comprising, a servo connected to operate said valve to control vehicle speed, a source of fluid pressure for actuating said servo, control means for said servo including vehicle speed error sensing and signal means for controlling fluid pressure transmitted from said source to said servo, and negative feed-back means responsive to opening and closing throttle movement of said servo to modify the control of said vehicle speed error sensing means; said negative feed-back means including, a pair of control orifices intermediate said pressure source and said servo with one of said orifices having a smaller orifice area than the other of said orifices, and means including valve means for establishing one of said orifices in control during throttle opening movement of said servo and the other of said orifices in control during throttle closing movement of said servo, said orifice control establishing means further including an apertured arm movable with movement of said servo and a rod frictionally engaged in the aperture thereof and engageable with said valve means to move said valve means to one of the orifice control positions and to disengage said valve means upon throttle closing movement of said servo whereby said valve means is opened under differential pressure action.

References Cited in the file of this patent

UNITED STATES PATENTS

| | | |
|---|---|---|
| 2,073,332 | Brooke | Mar. 9, 1937 |
| 2,324,191 | Bowers | July 13, 1943 |
| 2,333,184 | Kalin | Nov. 2, 1943 |
| 2,367,606 | Olson | Jan. 16, 1945 |
| 2,368,822 | Gardner | Feb. 6, 1945 |
| 2,671,542 | Robnett | Mar. 9, 1954 |
| 2,837,060 | Teetor | June 3, 1958 |
| 2,910,974 | Caris | Nov. 3, 1959 |
| 2,990,825 | Fuller et al. | July 4, 1961 |
| 3,003,475 | Rouvalis | Oct. 10, 1961 |
| 3,068,849 | Thorner | Dec. 18, 1962 |